United States Patent
Maiocco, Sr.

[11] Patent Number: 5,491,466
[45] Date of Patent: Feb. 13, 1996

[54] CLUTCH AND THROTTLE RESPONSIVE BRAKE LIGHT CONTROL APPARATUS AND METHOD

[75] Inventor: Richard P. Maiocco, Sr., Phoenix, Ariz.

[73] Assignees: Charles J. Davis; Walter R. Andrews, both of Phoenix, Ariz.

[21] Appl. No.: 69,440

[22] Filed: Jun. 1, 1993

[51] Int. Cl.⁶ ................................................ B60Q 1/44
[52] U.S. Cl. ........................................ 340/467; 340/479
[58] Field of Search ................................ 340/467, 466, 340/464, 463, 479, 458, 641, 642; 307/10.8; 200/61.47, 61.89

[56] References Cited

U.S. PATENT DOCUMENTS 2,128,764  8/1938  Finnell .................................. 340/467
3,601,796  8/1971  Mortimer ............................... 340/467
4,922,225  5/1990  Pankert .................................. 340/467

Primary Examiner—Victor R. Kostak
Assistant Examiner—Nathan J. Flynn
Attorney, Agent, or Firm—Parsons & Associates; Don J. Flickinger; Robert A. Parsons

[57] ABSTRACT

A motor vehicle (10) includes a brake light (12) controlled by a clutch system (32), a brake system (34), and a throttle system (36). The brake light (12) illuminates whenever the vehicle's brakes are applied. In addition, the brake light (12) illuminates when the clutch system (32) is engaged or when the throttle system (36) is in an idle state. However, a timing circuit 40 inserts a delay before illuminating brake light 12 as a result of engaging the clutch system (32) or idling the throttle system (36).

15 Claims, 1 Drawing Sheet

5,491,466

CLUTCH AND THROTTLE RESPONSIVE BRAKE LIGHT CONTROL APPARATUS AND METHOD

TECHNICAL FIELD OF THE INVENTION

The present invention relates generally to motor vehicle brake lights. More specifically, the present invention relates to an apparatus for illuminating brake lights in a variety of diverse circumstances.

BACKGROUND OF THE INVENTION

Brake lights represent one of the many important safety features included on a motor vehicle. Typically, brake lights indicate when a vehicle's brakes are being applied. This indication signals the driver of a following vehicle of a need to slow down to avoid a rear-end collision. However, in spite of the use of brake lights, the incidence of rear-end collisions remains undesirably high.

The high incidence of rear-end collisions is due, at least in part, to the fact that conventional brake lights fail to announce all situations in which a vehicle may be slowing, moving slowly, or even stopped. For example, when a leading vehicle's driver removes his or her foot from the vehicle's throttle but does not apply brakes, the leading vehicle slows without conventional brake lights activating. In another example, a vehicle may be stopped at a stop light, stop sign, or other roadway position without the vehicle's driver applying brakes. In yet another situation, a vehicle may be slowly creeping away from a stopped condition without brake lights being activated.

In these and other circumstances, a vehicle may present no indication to grab the attention of a following vehicle's driver. Unless the driver of a following vehicle pays very close attention, a rear-end collision may occur. In recent years, traffic congestion in urban areas has increased, and the spacing between vehicles on the roadways has decreased. Consequently, the likelihood of being involved in a rear-end collision where brake lights are not been activated in a timely manner has increased.

Due to differences in the way manual transmission vehicles and automatic transmission vehicles tend to be operated, different vehicles face different rear-end collision risks in different situations. Drivers of both automatic and manual transmission vehicles slow their vehicles small amounts without applying brakes by allowing their vehicles' throttles to return to idle positions or states. However, manual transmission drivers are likely to significantly slow their vehicles without applying brakes by shifting to a lower gear. When an automatic transmission vehicle is stopped, such as at a stop light or stop sign, the vehicle's driver typically keeps brakes applied to prevent the vehicle from creeping forward. However, manual transmission vehicle drivers often may remove their feet from their vehicles' brakes after stopping so that they may prepare for movement when the opportunity presents itself. On the other hand, an automatic transmission vehicle driver may occasionally tend to creep away from a stopped position simply by removing his or her foot from a brake pedal. A following vehicle's driver receives no indication of whether the leading vehicle is creeping or accelerating significantly.

SUMMARY OF THE INVENTION

Accordingly, it is an advantage of the present invention that an improved brake light apparatus and method are provided.

Another advantage of the present invention is that a vehicle's brake lights are activated in a variety of circumstances rather than only when the vehicle's brakes are applied.

Another advantage is that the present invention provides an apparatus and method for activating brake lights when a vehicle's throttle is in an idle state.

Another advantage is that the present invention provides an apparatus and method for activating brake lights when a vehicle's clutch is engaged.

Another advantage is that the present invention provides an apparatus and method for preventing brake light activation upon normal throttle and clutch operation.

The above and other advantages of the present invention are carried out in one form by a motor vehicle brake light control apparatus. The apparatus is used in connection with a motor vehicle that has a throttle and a brake light. The apparatus enhances safety in connection with the operation of the motor vehicle. The apparatus includes a device which couples to the throttle and which indicates when the throttle is substantially in an idle state. A timing circuit couples to the throttle indicating device. The timing circuit is configured so that an output of the timing circuit activates a predetermined duration after the throttle becomes positioned substantially in the idle state. A device for energizing the brake light couples to the timing circuit. This device energizes the brake light when the timing circuit output activates.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
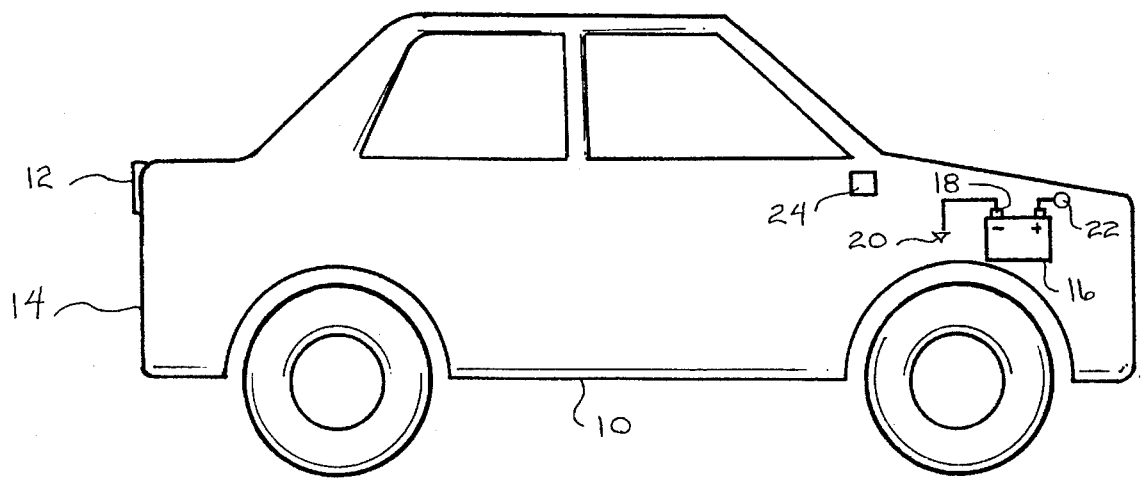
FIG. 1 shows a exemplary vehicle of the type with which the apparatus and method of the present invention may be practiced.

FIG. 1 shows a motor vehicle 10 configured in accordance with the present invention. Vehicle 10 may have either a standard transmission or an automatic transmission. Vehicle 10 includes a brake light 12 located proximate a rear side 14 of vehicle 10 and facing backwards with respect to vehicle 10. Brake light 12 serves as an indicator which announces when vehicle brakes are being applied and other situations which are discussed below. Strictly speaking, brake light 12 announces more than the mere application of brakes. One or more of left and right lower brake lights or a center high-mounted stop lamp (CHMSL) which are conventional on motor vehicles may serve as brake light 12. Additionally or alternatively, brake light 12 may be provided by one or more accessory lights which are added to vehicle 10 to accomplish the purposes of the present invention. While FIG. 1 illustrates vehicle 10 as being a passenger car, those skilled in the art will appreciate that the present invention is not limited to passenger cars but may be adapted to any motor vehicle which may incorporate one or more brake lights.

Vehicle 10 additionally includes a source of electrical power, such as a battery 16. In one embodiment, battery 16 includes a negative terminal 18 coupled to a ground 20 for vehicle 10 and a positive terminal 22 which supplies a positive voltage. Of course, those skilled in the art will appreciate that alternative embodiments of the present invention may be configured for a positive ground system. Battery 16 serves as a source of electrical power for a stop light control circuit 24, which may reside anywhere within vehicle 10, such as behind a dashboard (not shown).

Figure 2:
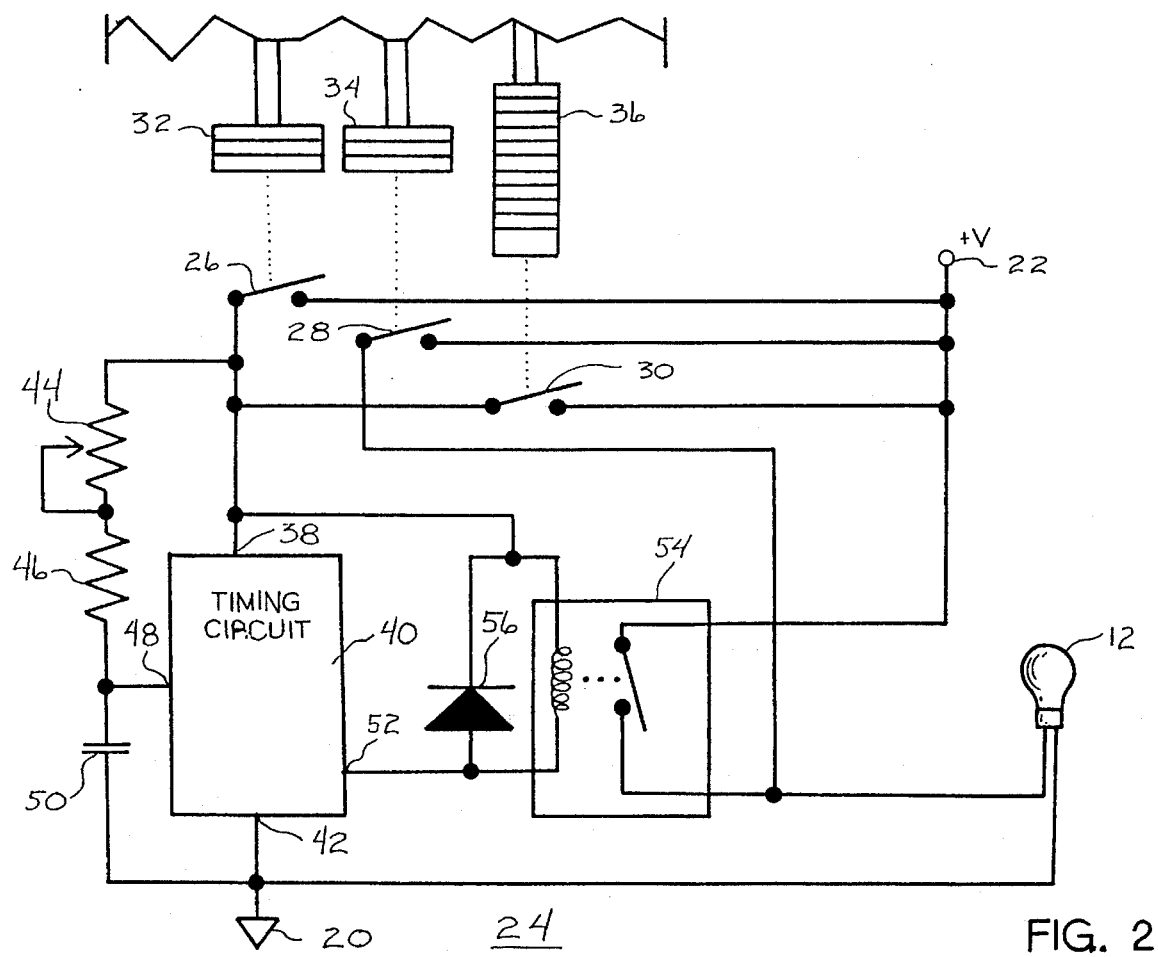
FIG. 2 shows a schematic diagram depicting the apparatus and method of the present invention.

FIG. 2 shows a schematic diagram of stop light control circuit 24. Stop light control circuit 24 includes a clutch switch 26, a brake switch 28, and a throttle switch 30. In the preferred embodiment, clutch switch 26 is mechanically, hydraulically, or electrically controlled by a clutch system 32 of vehicle 10 (see FIG. 1) so that switch 26 closes when clutch system 32 is substantially engaged and opens when clutch system 32 is not engaged. When clutch system 32 is engaged, rotary motion of a motor (not shown) of vehicle 10 is not transmitted to the vehicle's transmission. Of course, those skilled in the art will appreciate that clutch switch 26 and clutch system 32 will be omitted on vehicles 10 with automatic transmissions. Moreover, while FIG. 2 depicts clutch system 32 as a clutch pedal, any portion of an entire clutch system may control clutch switch 26. For example, an entire clutch system may include a clutch pedal, linkages, whether mechanical, hydraulic or electrical, a throw-out bearing, a pressure plate, a clutch plate, and the like.

In the preferred embodiment, brake switch 28 is mechanically, hydraulically, or electrically controlled by a brake system 34 so that brake switch 28 closes when brakes are applied and opens when brakes are not applied. Brake switch 28 may be a conventional vehicle's brake switch or may be another switch dedicated for use by stop light control circuit 24. Those skilled in the art will appreciate that, while FIG. 2 depicts brake system 34 as a brake pedal, any portion of an entire brake system may control brake switch 28. For example, an entire brake system may include a brake pedal, a master cylinder, hydraulic lines, slave cylinders, brake calipers and/or shoes, and the like, along with a conventional brake switch and corresponding wiring and lights.

Throttle switch 30 is mechanically or electrically controlled by a throttle system 36 so that throttle switch 30 closes when throttle system 36 is substantially in an idle state and opens when throttle system 36 is not in an idle state. While FIG. 2 depicts throttle system 36 as being a gas pedal, those skilled in the art will appreciate that any portion of an entire throttle system may control throttle switch 30. For example, an entire throttle system may include a gas pedal, linkages, a carburetor or fuel injection system, intake manifolds, fuel systems, and the like. Moreover, those skilled in the art will appreciate that the idle state for throttle system 36 roughly corresponds to a gas pedal not being depressed. A motor for vehicle 10 need not be idling when a throttle system is in its idle state. Rather, when throttle system 36 is in its idle state a minimal amount of fuel for then-current conditions is being fed to the vehicle's motor.

Each of switches 26, 28, and 30 has first and second nodes. The first node of each of switches 26, 28, and 30 couples to terminal 22, which supplies a positive voltage. Second nodes of switches 26 and 30 couple together and to a power terminal 38 of a solid state timing circuit 40, such as a 555 timer supplied by numerous semiconductor manufacturers. A ground terminal 42 of timing circuit 40 couples to ground terminal 20 of vehicle 10. A first node of a potentiometer 44 also couples to the second nodes of switches 26 and 30. A wiper of potentiometer 44 and a second node of potentiometer 44 couple in series through a resistor 46 to a charge sensing input 48 of timing circuit 40. A capacitor 50 couples between charge sensing input 48 and ground terminal 42.

An output node 52 of timing circuit 40 couples to a control node of an electrically controlled switch, such as relay 54. In particular, node 52 couples to a first terminal of a solenoid for relay 54 and to an anode of a diode 56. A second terminal of the solenoid for relay 54 and a cathode for diode 56 both couple to the second nodes of switches 26 and 30. Positive voltage terminal 22 couples to one node of a switch for relay 54 while a second node of the switch for relay 54 couples to the second node of brake switch 28 and to a first node of brake light 12. Relay 54 is configured so that its switch is open unless its solenoid is activated. A second node of brake light 12 couples to ground terminal 20.

In operation, whenever brakes are applied, electrical energization is applied through brake switch 28 to brake light 12, causing brake light 12 to illuminate. This occurs regardless of the state of timing circuit 40, relay 54, or switches 26 and 30.

So long as throttle system 36 is not in its idle state and clutch system 32 is not engaged, energization is not applied to timing circuit 40 and to capacitor 50. Any charge stored in capacitor 50 will bleed off, and relay 54 will be open.

When either of two events occurs, electrical energization will be applied to timing circuit 40 and to capacitor 50. One of these two events occurs when throttle system 36 enters its idle state, and the other event occurs when clutch system 32 is engaged. Of course, if clutch switch 26 has been omitted, energization is applied to timing circuit 40 and capacitor 50 only when throttle system 36 is in its idle state. When either one or both of these two energizing events occur, a voltage is supplied through switches 26 and/or 30 to timing circuit 40 and to capacitor 50. The voltage is supplied to capacitor 50 substantially through potentiometer 44 and resistor 46. Thus, capacitor 50 begins to charge at a rate controlled by the resistance of potentiometer 44 in series with resistor 46. Potentiometer 44 is provided so that the charging rate may be manually varied. Resistor 46 is provided so that the charging rate may be kept above a minimum level regardless of any particular setting on potentiometer 44.

When electrical energization is initially applied to timing circuit 40, output node 52 is deactivated. Thus, output node 52 presents a high impedance and cannot sink a significant amount of current through the solenoid of relay 54. Thus, the switch of relay 54 remains open. However, when capacitor 50 eventually charges to a predetermined voltage level, as detected at charge sensing input 48, output node 52 of timing circuit 40 activates, and output node 52 sinks current through the solenoid of relay 54. This causes the switch of relay 54 to close, energization to be applied to brake light 12, and brake light 12 to illuminate. Brake light 12 illuminates regardless of whether brakes have been applied.

In the preferred embodiment of the present invention, potentiometer 44, and resistor 46 are configured in cooperation with capacitor 50 so that the switch of relay 54 closes around 2–5 seconds after energization is applied through switches 26 and/or 30. This delay prevents brake light 12 from illuminating as a result of normal gear shifting or momentary coasting (i.e. throttle system idling). However, significant coasting, as occurs when a driver is significantly slowing his or her vehicle without applying brakes, leads to brake light 12 becoming illuminated. Likewise, when a driver engages a vehicle's clutch for a significant period of time, as occurs at a stop light or stop sign, brake light 12 illuminates regardless of whether vehicle brakes are being applied. Moreover, when a driver slowly creeps away from a stopped condition, as occurs when brakes are removed in an automatic transmission vehicle without applying throttle, brake light 12 is again illuminated. When a clutch disengages and/or a throttle is again activated, energization is removed from timing circuit 40, and the switch of relay 54 opens. So long as brakes are not simultaneously being applied, brake light 12 goes out.

In summary, the present invention provides an improved brake light apparatus and method. A vehicle's brake lights are activated in a variety of situations including, but not limited to, the situation where the vehicle's brakes are applied. Brake lights are also activated when a vehicle's throttle is in an idle state. In a manual transmission vehicle, brake lights are also activated when the vehicle's clutch is engaged. However, a timing circuit prevents brake light activation upon normal throttle and clutch operation while driving.

The present invention has been described above with reference to preferred embodiments. However, those skilled in the art will recognize that changes and modifications may be made in these preferred embodiments without departing from the scope of the present invention. Such changes and modifications which are obvious to those skilled in the art are intended to be included within the scope of the present invention.

What is claimed is:

1. A motor vehicle brake light control apparatus for use in connection with a motor vehicle having a throttle, a clutch, and a brake light and for enhancing safety in connection with the operation of said motor vehicle, said apparatus comprising:

means, coupled to said throttle, for indicating when said throttle is substantially in an idle state;

a timing circuit coupled to said indicating means and having an output, said timing circuit being configured so that said output activates a predetermined duration after said throttle becomes positioned substantially in said idle state;

means, coupled to said timing circuit output, for energizing said brake light at full power when said timing circuit output activates; and means coupled to said clutch and to said timing circuit, for indicating when said clutch is substantially engaged so that said timing circuit output activates at substantially said predetermined duration after said clutch is engaged.

2. A motor vehicle brake light control apparatus as claimed in claim 1 additionally comprising:

a brake switch coupled to said energizing means and configured to cause said brake light to become energized upon application of vehicle brakes.

3. A motor vehicle brake light control apparatus as claimed in claim 1 wherein:

said vehicle additionally comprises a source of electrical power;

said timing circuit comprises a solid state device having a power terminal; and said clutch indicating means comprises a switch having a first node coupled to said source of electrical power and a second node coupled to said power terminal.

4. A motor vehicle brake light control apparatus as claimed in claim 1 wherein:

said vehicle additionally comprises a source of electrical power;

said timing circuit comprises a solid state device having a power terminal; and said means for indicating when said throttle is substantially in said idle state comprises a switch having a first node coupled to said source of electrical power and a second node coupled to said power terminal.

5. A motor vehicle brake light control apparatus as claimed in claim 4 wherein said timing circuit further comprises:

a resistance coupled to said solid state device; and a capacitor coupled to said solid state device, said resistance and capacitor being configured to define said predetermined duration.

6. A motor vehicle brake light control apparatus as claimed in claim 5 wherein said resistance comprises a potentiometer to permit manual adjustment of said predetermined duration.

7. A motor vehicle brake light control apparatus as claimed in claim 6 wherein said resistance and said capacitor are configured so that said predetermined duration is in a range of 2–5 seconds.

8. A motor vehicle brake light control apparatus as claimed in claim 1 wherein:

said vehicle additionally comprises a source of electrical power; and said energizing means comprises an electrically operated switch having a first node coupled to said source of electrical power, a second node coupled to said brake light, and a control node coupled to said timing circuit.

9. In a motor vehicle having a brake light, a clutch, and a throttle, a method of operating said brake light in connection with the operation of said vehicle to enhance safety, said method comprising the steps of:

determining when said throttle is substantially in an idle state;

determining when said clutch is substantially engaged;

delaying a predetermined duration after said throttle enters said idle state;

delaying substantially said predetermined duration after said clutch is engaged; and energizing said brake light at full power after said predetermined duration has transpired.

10. A method of operating a brake light as claimed in claim 9 wherein said motor vehicle has vehicle brakes, and said energizing step comprises the step of:

activating said brake light when said vehicle brakes are applied regardless of whether said predetermined duration has transpired.

11. A method of operating a brake light as claimed in claim 10 said method additionally comprising the steps of:

de-energizing a solid state timing circuit when said throttle is not substantially in said idle state and when said clutch is not engaged; and energizing said timing circuit when said throttle is substantially in said idle state or when said clutch is substantially engaged.

12. In a standard transmission motor vehicle, a motor vehicle brake light apparatus for enhancing safety by annunciating slowing and stopped conditions, said apparatus comprising:

a source of electrical power;

a clutch having a first switch coupled thereto, said first switch having a first node coupled to said source of electrical power and having a second node;

a throttle having a second switch coupled thereto, said second switch having a first node coupled to said source of electrical power and having a second node;

a brake system having a third switch coupled thereto, said third switch having a first node coupled to said source of electrical power and having a second node;

a solid state timing circuit having a power terminal and an output terminal, said power terminal being coupled to said second nodes of said first and second switches so that said timing circuit energizes when said clutch is engaged or when said throttle is in an idle state, said timing circuit being configured to activate said timing circuit output terminal a predetermined duration after said timing circuit energizes;

a light coupled to said second node of said third switch so that said light at full power activates at full power whenever said brake system is activated; and an electrically operated switch coupled to said output of said timing circuit and to said light so that said light activates at full power whenever said timing circuit output terminal activates.

13. A motor vehicle brake light apparatus as claimed in claim 13 additionally comprising:

a resistance coupled to said solid state timing circuit; and a capacitor coupled to said solid state timing circuit, said resistance and capacitor being configured to define said predetermined duration.

14. A motor vehicle brake light apparatus as claimed in claim 13 wherein said resistance comprises a potentiometer to permit manual adjustment of said predetermined duration.

15. A motor vehicle brake light apparatus as claimed in claim 13 wherein said resistance and said capacitor are configured so that said predetermined duration is in a range of 2–5 seconds.

\* \* \* \* \*